(12) United States Patent
Drennan et al.

(10) Patent No.: US 11,591,522 B2
(45) Date of Patent: *Feb. 28, 2023

(54) PROCESS FOR THE THERMAL DEGRADATION OF RUBBER CONTAINING WASTE

(71) Applicant: Keshi Technologies Pty Ltd, Fremantle (AU)

(72) Inventors: Andrew Drennan, Fremantle (AU); Phil Erasmus, Fremantle (AU); Bert Huys, Fremantle (AU)

(73) Assignee: Keshi Technologies Pty Ltd, Fremantle (AU)

(*) Notice: Subject to any disclaimer, the term of this patent is extended or adjusted under 35 U.S.C. 154(b) by 0 days.

This patent is subject to a terminal disclaimer.

(21) Appl. No.: 17/490,128

(22) Filed: Sep. 30, 2021

(65) Prior Publication Data

US 2022/0025271 A1 Jan. 27, 2022

Related U.S. Application Data

(63) Continuation of application No. 16/467,554, filed as application No. PCT/AU2017/051357 on Dec. 8, 2017, now Pat. No. 11,168,259.

(51) Int. Cl.
  *C10B 47/44* (2006.01)
  *C10B 7/10* (2006.01)
  (Continued)

(52) U.S. Cl.
  CPC ............ *C10B 7/10* (2013.01); *C10B 47/44* (2013.01); *C10B 53/07* (2013.01); *C10B 57/02* (2013.01);
  (Continued)

(58) Field of Classification Search
  CPC .. B65G 33/24; B65G 33/34; B65G 2811/095; B65G 2811/097; B65G 33/26;
  (Continued)

(56) References Cited

U.S. PATENT DOCUMENTS

| 1,810,828 A | 6/1931 | Hayes |
|---|---|---|
| 1,884,379 A | 10/1932 | Tenney |

(Continued)

FOREIGN PATENT DOCUMENTS

| CN | 104479722 A | 4/2015 |
|---|---|---|
| JP | 2012136672 | 7/2012 |

(Continued)

OTHER PUBLICATIONS

Examination Report for Australian Application No. 2021106104, dated May 19, 2022.

(Continued)

*Primary Examiner* — Jonathan Luke Pilcher
(74) *Attorney, Agent, or Firm* — Womble Bond Dickinson (US) LLP

(57) ABSTRACT

A process for the non-oxidative thermal degradation of a rubber containing waste including: transporting the rubber containing waste along a horizontal axis of a hermetically sealed cylindrical reactor including: an inlet and an outlet, one or more thermal reaction zones arranged between the inlet and the outlet, wherein each thermal reaction zone is provided with: one or more heating elements controllable to heat the thermal reaction zone to an operating temperature for mediating the non-oxidative thermal degradation of rubber in the rubber containing waste, and one or more gas outlets for withdrawing volatile gas or gases evolved during the non-oxidative thermal degradation of the rubber; and a screw auger located within the reactor, the screw augur configured to rotate in both the forward and reverse direc- (Continued)

tions to agitate and transport the rubber containing waste through the one or more thermal reaction zones in both the forward and reverse directions and to the outlet; heating the rubber containing waste, in the one or more thermal treatment zones, to a temperature above the degradation temperature of rubber for a time sufficient to produce the volatile gas or gases and the char product; operating the screw auger in both the forward and reverse directions to agitate the rubber containing waste within the reactor; and advancing the rubber containing waste along the horizontal axis to the outlet.

18 Claims, 6 Drawing Sheets

(51) Int. Cl.
*C10B 53/07* (2006.01)
*C10B 57/02* (2006.01)
*C10B 57/14* (2006.01)
*C10B 57/16* (2006.01)
*C10G 1/10* (2006.01)
*C10B 1/06* (2006.01)

(52) U.S. Cl.
CPC ............... *C10B 57/14* (2013.01); *C10B 57/16* (2013.01); *C10G 1/10* (2013.01); *C10B 1/06* (2013.01); *C10G 2300/1003* (2013.01); *Y02P 20/143* (2015.11)

(58) Field of Classification Search
CPC ......... C10B 47/18; C10B 47/32; C10B 47/44; C10B 1/06; C10B 53/07; C10G 1/10
See application file for complete search history.

(56) References Cited

U.S. PATENT DOCUMENTS

| | | | |
|---|---|---|---|
| 4,084,521 A | 4/1978 | Herbold et al. | |
| 4,123,332 A | 10/1978 | Rotter | |
| 5,296,005 A | 3/1994 | Wolfe et al. | |
| 5,584,641 A | 12/1996 | Hansen | |
| 6,736,940 B2 | 5/2004 | Masemore et al. | |
| 6,758,150 B2 | 7/2004 | Ballantine et al. | |
| 8,865,112 B2 | 10/2014 | Dulger et al. | |
| 9,920,251 B2 | 3/2018 | Karanikas | |
| 10,184,081 B2 | 1/2019 | Dulger et al. | |
| 11,162,030 B2* | 11/2021 | Erasmus | C10B 7/10 |
| 11,168,259 B2* | 11/2021 | Drennan | C10G 1/10 |
| 2002/0119089 A1 | 8/2002 | Masemore et al. | |
| 2003/0010266 A1 | 1/2003 | Ballantine et al. | |
| 2004/0182001 A1 | 9/2004 | Masemore et al. | |
| 2006/0076224 A1 | 4/2006 | Ku | |
| 2010/0076245 A1 | 3/2010 | Kaczmarek | |
| 2011/0136971 A1 | 6/2011 | Tucker | |
| 2012/0217150 A1 | 8/2012 | Kostek, Sr. et al. | |
| 2013/0064754 A1 | 3/2013 | Dulger et al. | |
| 2014/0262728 A1 | 9/2014 | Karanikas | |
| 2014/0374234 A1 | 12/2014 | Dulger et al. | |
| 2018/0023005 A1 | 1/2018 | Beaver et al. | |
| 2019/0300793 A1 | 10/2019 | Erasmus et al. | |
| 2019/0300794 A1 | 10/2019 | Drennan et al. | |
| 2022/0025269 A1* | 1/2022 | Erasmus | C10G 1/10 |

FOREIGN PATENT DOCUMENTS

| | | |
|---|---|---|
| WO | 2005049530 | 6/2005 |
| WO | 2013155238 | 10/2013 |

OTHER PUBLICATIONS

Examination Report for Australian Application No. 2021106096, dated May 19, 2022.
International Search Report and Written Opinion for PCT/AU2017/051357, dated Feb. 23, 2018.
"Safety Data Sheet Carbon Black", Cancarb Limited—Safety, Health and Environmental Department, May 25, 2015.
"Construction Materials", TireRack.com, Dec. 7, 2012 (date obtained from Wayback Machine), URL: https://www.tirerack.com/tires/tiretech/techpage.jsp?techid=9.
Abdulbaki et al., "Final Design Report, Pyrolysis Feeder", Apr. 15, 2015, Macdonald Campus of McGill University.
Examination Report for Australian Application No. 2017371717, dated Jul. 18, 2022.

* cited by examiner

PROCESS FOR THE THERMAL DEGRADATION OF RUBBER CONTAINING WASTE

PRIORITY CLAIM

This is a continuation of U.S. Non-Provisional application Ser. No. 16/467,554, filed Jun. 7, 2019, titled "PROCESS FOR THE THERMAL DEGRADATION OF RUBBER CONTAINING WASTE," which is a 35 U.S.C. 371 National Stage of International Application No. PCT/AU2017/051357, filed Dec. 8, 2017, titled "PROCESS FOR THE THERMAL DEGRADATION OF RUBBER CONTAINING WASTE," which claims priority to Australia Application No. 2016905092, filed Dec. 9, 2016, the disclosures of which are incorporated herein by reference in their entireties.

FIELD OF THE INVENTION

The present invention is directed towards a process for the thermal degradation of a rubber containing waste.

BACKGROUND OF THE INVENTION

Each year, millions of tonnes of waste rubber products are discarded. One of the primary and most problematic sources of this waste rubber is used tyres. These tyres may be from: on road vehicles ranging from bicycle tyres, motorcycle tyres, car tyres and heavy vehicle tyres; agricultural vehicle tyres; industrial tyres such as for aircraft, forklifts tyres and OTR and Haul pack tyres in the mining sector. Other sources of waste rubber include: industrial waste, such as conveyor belting; and consumer market scrap rubber from the manufacture of products such as but not limited to footwear, furniture, medical waste and many other domestic and commercial products. Historically much of this rubber waste ends up in landfill, such as in tyre disposal yards.

Given the significant amounts of rubber waste that is generated each year, there is substantial interest in finding an economic and environmentally sustainable solution for dealing with the rubber waste.

As indicated above, the primary and most problematic source of rubber waste is in the form of used tyres. A used tyre carcass is composed of several parts, including: the tread, the bead, and the sidewall.

The tread is the part of the tyre that contacts road surfaces, and as such is the component that becomes worn during use leading to the tyre being discarded. The tread consists of a thick rubber composite compound and is formulated to provide an appropriate level of traction and is designed not to wear away too quickly. The rubber may be natural or synthetic, and may additionally include carbon black and numerous hydrocarbon-based chemicals. Various types and blends of rubbers are used in the manufacture of tyres with the most common being styrene-butadiene copolymer. The tread pattern imprinted on tyres is characterised by a geometric shape of grooves lugs, voids and sipes. All features on the tread surface of a tyre are designed to allow water to escape from between the tyre and the traction surface to prevent hydroplaning, or in the case of OTR tyres, to promote traction with the surface they are coming in contact with. Immediately under this tread section of tyre is various reinforcing material, sometimes, this material only consists of a cloth or nylon type fabric. Commonly found is a woven steel fabric vulcanised into the rubber. This vulcanisation process makes it difficult to recycle used tyres.

The bead is vulcanised steel reinforcement designed for tyre support that comes in contact with the rim on the wheel. The bead is typically reinforced with a high-grade high tensile steel wire and a low flexibility rubber. The bead seals tightly against the two rims on the wheel to ensure that in the case of a tubeless tyre that the tyre holds air without leakage. The bead is designed to fit snugly and tight to ensure that the tyre does not rotate circumferentially as the wheel rotates.

The side wall is a part of the tyre that bridges between the bead and the tread. The side wall is proportionally composed largely of rubber but will often have reinforcing fabric or fine steel meshes and fibres vulcanised in its construction which provide tensile strength and flexibility. The main purpose of the sidewall is to contain air pressure and transmit torque applied from the drive axle to the traction circle below the tread.

Recently, there has been a move to recycle waste tyres by repurposing them or converting them into other products. In some instances the tyres can be used whole. However, this approach is inadequate for dealing with the substantial amount of waste tyres that are produced each year.

Another approach is the physical fragmentation of the tyres into pieces of varying sizes by some physical means such as the use of shredders and/or the use of hammer mills or granulation, then once the waste rubber is broken up, in most cases the steel wires and steel fragments are removed along with any nylon or fibreglass contamination and then the rubber is re-claimed to produce a recycled rubber product. Often the poor quality of this recycled rubber product due to the blending of synthetic and natural rubber renders it unsuitable for use as a raw material to produce new rubber (e.g. for use in the manufacture of new tyres). Instead, this fragmented and processed rubber is used in the formation of products that can tolerate large variances in the rubber's chemical make up in their manufacture in such cases they are often bonded with adhesives or solvents to form the end product, such as but not limited to the manufacture of rubber matting, soft fall surfaces, athletic track surfaces and many other sporting facilities along with child playground equipment surfaces or padding. These approaches are not without their downsides. They are inadequate for dealing with large volumes of waste tyres. Furthermore, they give rise to environmental problems due to the potential for heavy metals to leach out and contaminate ground water. Additionally, the metal containing fraction is often discarded to landfill as the cost and difficulty associated with separating the woven steel fabric from the remaining rubber is prohibitive.

A further approach involves digestion of the rubber using a chemical process. Following physical fragmentation of the rubber it is added to a chemical solution of cellulose degrading and destroying chemicals such as sodium hydroxide or zinc chloride or other solvents to break the rubber down into smaller organic molecules. Drawbacks and problems with the chemical degradation of rubber are numerous but primarily the process suffers from being uneconomical, and the requirement for further treatment and/or disposal of the resultant chemicals gives rise to environmental concerns.

Another approach to disposing of waste tyres is through pyrolytic degradation. Tyre pyrolysis involves heating a batch of waste tyres in an oxygen-free atmosphere to degrade the rubber in the waste tyres into smaller organic molecules. These smaller molecules are typically formed in the vapour phase, and can be condensed for recovery. This batch pyrolysis process is generally operated at high temperature, generally at 1400° C. or greater, to promote the formation of fuel oil products, such as those in diesel. This requires a substantial amount of heat energy. The minerals that formed part of the tyre, around 40% by weight, are converted to ash or char. This ash or char is generally considered to have little or no commercial value. Tyre pyrolysis is generally considered uneconomical due to the large energy requirements and the low value of the output products.

In view of the above, there is a need for a commercially viable mechanism for dealing with waste tyres that is environmentally sound.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

There is disclosed herein a hermetically sealed flow-through reactor for non-oxidative thermal degradation of a rubber containing waste into a char product, the reactor having an internal cylindrical surface, and the reactor including:

an inlet and an outlet, one or more thermal reaction zones arranged between the inlet and the outlet, wherein each thermal reaction zone is provided with:

one or more heating elements controllable to heat the thermal reaction zone to an operating temperature for mediating the non-oxidative thermal degradation of rubber in the rubber containing waste, and one or more gas outlets for withdrawing gas or gases evolved during the non-oxidative thermal degradation of the rubber; and a screw auger located within the reactor, the screw augur configured to rotate in both the forward and reverse directions to agitate and transport the rubber containing waste through the one or more thermal reaction zones in both the forward and reverse directions and to the outlet, wherein flighting on the screw auger tracks the internal cylindrical surface of the reactor in close relationship to minimise or prevent the transport of material through a clearance space between outer edges of the flighting and the internal cylindrical surface of the reactor.

In an embodiment, the screw augur is controllable to rotate in both the forward and reverse directions.

Typically the output char product includes carbon ash, and steel, which may later be separated.

In one form, the reactor has a cylindrical reactor body, such as in the form of a sheet metal or plate metal shell (which may be formed, for example, from 16 mm or 32 mm sheet steel), the cylindrical reactor body having an internal cylindrical surface and an external cylindrical surface. The presence of an external cylindrical surface is advantageous where the heating elements are provided in the form of band heaters.

In one form, the reactor is oriented substantially horizontally, such that the reactor has a horizontal axis along which the rubber containing waste is transported by the screw auger.

The thermal reaction zones mediate the non-oxidative thermal degradation of rubber in the rubber containing waste. This is intended to mean that these thermal reaction zones are controlled to advance the degradation of rubber in the rubber containing waste into rubber depolymerisation products. To this end, the thermal reaction zones are provided with: at least one heating element to provide heat to the reaction zone to heat the rubber above its thermal degradation temperature; and gas outlets for extracting volatile depolymerisation components. The heating elements and gas outlets may be operated and controlled such that temperature and negative pressure (such as below atmospheric pressure) is applied to the thermal reaction zone to affect the thermal degradation reaction. The term "negative pressure" is intended to refer to a pressure that is below atmospheric pressure.

Preferably the rubber containing waste is tyre waste, such as stripped or shredded tyre waste. More preferably the rubber containing waste is shredded tyre waste that includes at least integrally formed rubber and steel mesh. Many prior reactors are unable to process shredded tyre waste due to the presence of the steel mesh. However, this reactor is able to accommodate the steel mesh, and in some instances it is advantageous to do so. Upon heating, the steel mesh provides an internal source of heat that promotes the thermal degradation of rubber. The steel mesh also improves the turbulence and mixing of the rubber to improve exposure to the heating environment and therefore improves the degradation process and the quality of the char product.

As discussed above, the flighting on the screw auger tracks the internal cylindrical surface of the reactor in close relationship to minimise the transport of material through the clearance space between outer edges of the flighting and the internal cylindrical surface of the reactor. This close relationship (or tight tolerance) therefore mitigates material short-circuiting the system. The close relationship also prevents or limits the transport of products from the thermal degradation reaction, including reaction gases, steel mesh, and carbon ash.

In one form, the clearance space between the outer edges of the flighting and the internal surface of the hermetically sealed cylindrical reactor is 7 mm or less. Preferably, the clearance space is 6 mm or less. More preferably, the clearance space is 5 mm or less. Even more preferably, the clearance space is 4 mm or less. Most preferably, the clearance space is 3 mm or less. The inventors have found that having a tight tolerance between the flighting and the internal surface of the reactor advantageously minimises reactants and/or reaction products from inadvertently passing into or out of a thermal reaction zone, and short-circuiting the system or potentially having an adverse effect on the reaction in subsequent zones.

In an embodiment, the reactor includes at least a first gas outlet and a second gas outlet for withdrawing gas or gases evolved during the non-oxidative thermal degradation of the rubber; wherein the first gas outlet is located upstream of the second gas outlet, and the first gas outlet is configured to withdraw the gas or gases at a larger volumetric flow rate than the second gas outlet. By upstream it is meant that the first gas outlet is located closer to the reactor inlet than the second gas outlet.

In one or more forms of the above mentioned embodiment, the first gas outlet and the second gas outlet are first and second gas extraction pipes, and the pressure drop across the second gas extraction pipe is greater than the first gas extraction pipe. This difference in pressure drop can be achieved in a number of different ways, for example: (i) the second gas extraction pipe has a smaller diameter than the first gas extraction pipe; (ii) the second gas extraction pipe is longer than the first gas extraction pipe; (iii) the second gas extraction pipe includes a flow restrictor; (iv) the second gas extraction pipe includes a valve, the valve being throttlable to increase the pressure drop through the second gas extraction pipe; or (v) a combination of one or more of the foregoing.

In a preferred arrangement, the first gas extraction pipe and the second gas extraction pipe are connected to a common exhaust manifold, such that the gas or gases are withdrawn from the reactor via the first gas extraction pipe and the second gas extraction pipe, and are transported to the common exhaust manifold. The exhaust manifold includes, or is connected to, a gas extraction blower which applies a negative pressure to the exhaust manifold to withdraw the gas or gases through the first gas extraction pipe and the second gas extraction pipe. As discussed above, the pressure drop across the second gas extraction pipe is greater than across the first gas extraction pipe, and as such the volumetric flow rate of gas or gases extracted through the first outlet greater than that extracted through the second gas outlet.

It is preferred that the reactor includes at least a first thermal reaction zone upstream of a second thermal reaction zone; wherein the first gas outlet is arranged to withdraw gas or gases from the first thermal reaction zone, and the second gas outlet is arranged to withdraw gas or gases from the second thermal reaction zone.

In still further forms of this embodiment, the reactor further includes a third gas outlet, wherein the third gas outlet is downstream of the second gas outlet. As above, the third gas outlet may be in the form of a third gas extraction pipe. By downstream it is meant that third gas outlet is located closer to the reactor outlet than the second gas outlet. In this form of the invention, the first gas outlet is additionally configured to withdraw the gas or gases at a larger volumetric flow rate than the third gas outlet. This may be achieved in the same manner as generally described above. Alternatively, the second and third outlets may be connected via a common gas extraction pipe. In instances where the second and third outlets are connected via the common gas extraction pipe, it is preferred that the common gas extraction pipe is of about the same length and diameter as the gas extraction pipe of the first outlet such that the volumetric gas flow rate through first outlet is about the same as the sum of the volumetric gas flow rate through the second and the third outlet. The third gas outlet may be located either on a third thermal reaction zone (in embodiments that include at least three thermal reaction zones) or on the outlet.

It will be appreciated that the reactor may include one more or additional gas outlets that may exhibit the same pressure drop as the first gas outlet or a different pressure drop from the first gas outlet. The one or more additional outlets may be located up stream or down stream of any one of the first, the second, and the third outlets. The one or more additional outlets may be associated with a reaction zone that is different from the reaction zones associated with the first, second, and third outlets. An exemplary reactor includes a first, a second, and a third reaction zone arranged sequentially from the inlet of the reactor to the outlet of the reactor. This reactor further includes an additional thermal reaction zone located between the first and second reaction zones. The first thermal reaction zone includes a first gas outlet with first gas extraction pipe, the second thermal reaction zone includes a second gas outlet with second gas extraction pipe, the third thermal reaction zone includes a third gas outlet with third gas extraction pipe, and the additional thermal reaction zone includes an additional gas outlet in the form of a corresponding gas extraction pipe. In this example, the second and third extraction pipes are connected via a T- or Y-junction that then connects to an exhaust manifold that is additionally connected to the first gas extraction pipe and the gas extraction pipe of the additional gas outlet. Each of the gas extraction pipes may be of the same size or length such that the pressure drop between each outlet and the exhaust manifold is about the same. However, as the second and third gas outlets are connected via the T- or Y-junction upstream of the manifold, the volumetric flow rate of gas through each of the second and third outlets is effectively half the volumetric flow rate of gas through the first outlet and the additional outlet.

The reactor may include a plurality of thermal reaction zones, such as from two to five thermal reaction zones e.g. two, three, four, or five reaction zones (although more are possible). In one such embodiment, the reactor includes:

at least two thermal reaction zones including:
a first thermal reaction zone including one or more first heating elements, the one or more first heating elements controllable to heat the first thermal reaction zone to a first operating temperature, and
a second thermal reaction zone including one or more second heating elements, the one or more second heating elements controllable to heat the second thermal reaction zone to a second operating temperature different to the first operating temperature.

In one form of this embodiment, the reactor includes at least three thermal reaction zones, and additionally includes a third thermal reaction zone including one or more third heating elements, the one or more third heating elements controllable to heat the third thermal reaction zone to a third operating temperature different to the first and/or second operating temperature.

In still another form of this embodiment, the reactor includes at least four thermal reaction zones, and additionally includes a fourth thermal reaction zone including one or more fourth heating elements, the one or more fourth heating elements controllable to heat the fourth thermal reaction zone to a fourth operating temperature different to the first and/or second and/or third operating temperature.

In various forms of the above embodiments and as appropriate, the first thermal reaction zone includes a first gas outlet, the second thermal reaction zone includes a second gas outlet, the third thermal reaction zone includes a third gas outlet, and the fourth thermal reaction zone includes a fourth gas outlet. Each gas outlet for withdrawing gas or gases evolved during the non-oxidative thermal degradation of the rubber in the corresponding zone. In a preferred form, the pressure drop across the first gas outlet is lower than the pressure drop against one or more of the second and/or third and/or fourth gas outlet.

In one form the reactor includes a heating zone configured to receive the tyre waste from the inlet and pre-heat the rubber containing waste, wherein the heating zone does not include a gas outlet. The purpose of the heating zone is to heat the rubber containing waste to soften the rubber. Generally gases are not evolved in this process, and as such, the heating zone does not include a gas outlet.

In one form, the inlet to the reactor includes an inlet air lock chamber and/or the outlet from the reactor includes an outlet air lock chamber. The use of these airlocks prevents or minimises the ingress of oxygen. This is important for providing a reaction environment that is favourable to the thermal degradation of rubber in the rubber containing waste. Preferably, the inlet air lock chamber is formed between two knife gate valves. The use of knife gate valves (instead of other valve types) has been found to provide an effective barrier against the entry of air into the respective airlock chambers. Alternatively, or additionally, the outlet air lock chamber is formed between two orifice knife gate valves. The use of orifice knife gate valves is particularly advantageous as carbon ash (as well as any oil that has condensed with the carbon ash) has a tendency to form a gunk in the moving components of standard gate and rotary valves.

In one form, the rate and direction of the screw auger is controllable. This advantageously allows the residence in the reactor to be controlled. Additionally, the ability for the auger to rotate in both the forward and backward direction additionally provides for an extended residence time while agitating the rubber containing waste material. As residence time can be increased in this manner, the length of the reactor can be reduced. Preferably the residence time of the rubber containing waste in the reactor is less than 2 hours, more preferably 1.5 hours or less, and even more preferably 1 hour or less.

In one form, the reactor is sized to fit within a standard sized shipping container of dimensions 40 ft long×8 ft wide×8 ft 6 in high. This is useful as it allows the reactor to be easily prepared for transport and shipping. It also allows provides a modular system for which the capacity can be easily expanded by adding further process modules including additional reactors.

There is further disclosed herein a system for non-oxidative thermal degradation of rubber containing waste into a char product, the system including:
the reactor described above, and
a control system configured to:
heat each thermal reaction zone to the operating temperature, and
communicate with a gas extraction system to maintain each thermal reaction zone at an negative operating pressure.

In one form, the control system is further configured to control the rate of rotation of the auger, and to operate the screw auger in both the forward and reverse directions.

In one form, the system further including ancillary processing equipment including:
a feed conveyor for transporting tyre waste to the inlet;
the gas extraction system including:
at least a condenser for condensing a condensable portion of the gas or gases into a liquid product, and
a product conveyer for transporting the char product to a separator, and
the separator for separating the char product into a metal containing fraction and a carbon char fraction.

In one form of the above embodiment, the gas extraction system additionally includes a burner and flue gas stack for combusting a non-condensable portion of the gas or gases and dispersing resulting flue gas or gases. In another form of the invention, the gas extraction system includes a gas fired generator to generate electricity via combustion of the non-condensable portion of the gas or gases. This electricity may be used to power at least a portion of the system.

In one form, the ancillary equipment further includes: a mill to comminute the carbon char fraction, and a cooling tower for cooling process water.

In one form, the ancillary equipment is compactible to fit within a standard sized shipping container of dimensions 40 ft long×8 ft wide×8 ft 6 in high.

In a first aspect of the invention, there is provided a process for the non-oxidative thermal degradation of a rubber containing waste including:
transporting the rubber containing waste along a horizontal axis of a hermetically sealed cylindrical reactor including:
an inlet and an outlet,
one or more thermal reaction zones arranged between the inlet and the outlet, wherein each thermal reaction zone is provided with:
one or more heating elements controllable to heat the thermal reaction zone to an operating temperature for mediating the non-oxidative thermal degradation of rubber in the rubber containing waste, and
one or more gas outlets for withdrawing volatile gas or gases evolved during the non-oxidative thermal degradation of the rubber; and
a screw auger located within the reactor, the screw augur configured to rotate in both the forward and reverse directions to agitate and transport the rubber containing waste through the one or more thermal reaction zones in both the forward and reverse directions and to the outlet,
subjecting the rubber containing waste, in the one or more thermal treatment zones, to a temperature above the degradation temperature of rubber for a time sufficient to produce the volatile gas or gases and the char product;
operating the screw auger in both the forward and reverse directions to agitate the rubber containing waste within the reactor; and
advancing the rubber containing waste along the horizontal axis to the outlet.

In a second aspect of the invention there is provided a process for the non-oxidative thermal degradation of rubber containing waste including:
feeding the rubber containing waste through an inlet and into a hermetically sealed cylindrical flow-through reactor having one or more thermal treatment zones arranged along a horizontal axis of the reactor between the inlet and the outlet of the reactor,
wherein each thermal reaction zone is provided with:
one or more heating elements controllable to heat the thermal reaction zone to an operating temperature for mediating the non-oxidative thermal degradation of rubber in the rubber containing waste, and
one or more gas outlets for withdrawing gas or gases evolved during the non-oxidative thermal degradation of the rubber;
operating one or more thermal treatment zones at a temperature at or above the thermal degradation temperature of rubber;
operating a screw auger in both the forward and reverse directions to agitate the rubber containing waste within the reactor and to transport the rubber containing waste along the horizontal axis of the reactor, and through the reactor at a rate to provide a residence time in the one or more thermal treatment zones sufficient to heat the rubber containing waste to a temperature above the degradation temperature of rubber, and to degrade rubber in the rubber containing waste into a volatile gas or gases and a char product;
applying a negative pressure to each thermal treatment zone to withdraw volatile gas or gasses that are formed in that thermal treatment zone from the non-oxidative thermal degradation of the rubber; and
discharging the char product through an outlet of the reactor.

In an embodiment of the first and/or second aspects, the volatile gas or gases include limonene.

In an embodiment of the first and/or second aspects, flighting on the screw auger tracks the internal cylindrical surface of the reactor in close relationship to minimise or prevent the transport of the volatile gas or gasses and/or the char product through a clearance space between outer edges of the flighting and the internal cylindrical surface of the reactor.

In an embodiment of the first and/or second aspects, the reactor includes:
  at least two thermal reaction zones including:
  a first thermal reaction zone including one or more first heating elements, the one or more first heating elements controllable to heat the first thermal reaction zone to a first operating temperature, and
  a second thermal reaction zone including one or more second heating elements, the one or more second heating elements controllable to heat the second thermal reaction zone to a second operating temperature different to the first operating temperature;
  the process further including:
  operating the first thermal reaction zone at the first operating temperature, the first operating temperature sufficient to form a first volatile gas or gases, and
  operating the second thermal reaction zone at the second operating temperature, the second operating temperature being higher than the first operating temperature, to enhance the conversion of the rubber to the char product and from a second volatile gas or gases.

It will be appreciated that the reactor may additionally include one or more further thermal reaction zones which may be located upstream and/or downstream of the first and/or second thermal reaction zones, each of the further reaction zones including corresponding heating elements and/or corresponding gas outlets for withdrawing gas or gases evolved in that thermal reaction zone.

It is preferred that in the first thermal reaction zone is operated at a temperature of from about 445° C. to about 550° C. More preferably, 450° C. and up to 530° C., and most preferably from 460° C. and up to 500° C. Additionally, or alternatively, it is preferred that the second thermal reaction zone is operated at a temperature of at least 550° C. More preferably, the second thermal reaction zone is operated at a temperature of below 1370° C. Even more preferably, up to 700° C. Still more preferably, up to 650° C.

It is preferred that the process further includes heating the rubber containing waste in the first thermal reaction zone to a temperature of from about 445° C. to about 550° C. More preferably, 450° C. and up to 530° C., and most preferably from 460° C. and up to 500° C. Alternatively, or additionally, it is preferred that the process includes heating the rubber containing waste in the second thermal reaction zone to a temperature of at least 550° C. More preferably, up to 1370° C. Even more preferably, up to 700° C. Still more preferably, up to 650° C.

It is preferred that the first volatile gas or gases is a sulfur gas or sulfur containing gas.

It is preferred that the second volatile gas or gases is substantially free of sulfur.

It is preferred that the second volatile gas or gases include limonene.

It is preferred that, the process further includes: applying a first negative pressure to the first thermal reaction zone, and applying a second negative pressure to the second thermal reaction zone. It is preferred that the first negative pressure and the second negative pressure are different. Typically the negative pressure applied to each of the thermal reaction zones is about −0.1 kPa. However, in an embodiment, a negative pressure of about −0.05 kPa is applied to the outlet. Preferably, a first gas is withdrawn from the first thermal reaction zone at a first gas volumetric flow rate, and a second gas is withdrawn from the second thermal reaction zone at a second gas volumetric flow rate, and wherein the first gas volumetric flow rate is greater than the second gas volumetric flow rate. Preferably, the first gas volumetric flow rate is from 1.1 to 3 times the second gas volumetric flow rate. More preferably the first gas volumetric flow rate is from 1.2 to 2.8 times the second gas volumetric flow rate. Still more preferably the first gas volumetric flow rate is from 1.3 to 2.6 times the second gas volumetric flow rate. Even more preferably the first gas volumetric flow rate is from 1.4 to 2.4 times the second gas volumetric flow rate. Most preferably the first gas volumetric flow rate is from 1.5 to 2.2 times the second gas volumetric flow rate.

In an embodiment of the first and/or second aspects, the process further includes the step of pre-heating the rubber containing waste to a temperature of at least 300° C. prior to transporting the rubber containing waste through the one or more thermal reaction zones. Preferably, the step of pre-heating the rubber containing waste is conducted in a heating zone of the reactor located upstream of the one or more thermal reaction zones.

In an embodiment of the first and/or second aspects, the process further includes the step of cooling the char product to a temperature of no less than about 400° C. prior to discharging the char product from the reactor. Preferably, the step of cooling the rubber containing waste is conducted in a cooling zone of the reactor located downstream of the one or more thermal reaction zones. In this context, the term "cooling zone" is intended to refer to a zone which is operated at a lower temperature than the thermal reaction zones, wherein the temperature of the char product is reduced. However, in the cooling zone, the char product is maintained at a temperature of no less than about 400° C., and as such, the cooling zone may be provided with one or more heating elements to maintain the desired temperature and/or one or more gas outlets.

In an embodiment of the first and/or second aspects, the process further includes feeding the rubber containing waste through the inlet via an inlet air lock chamber located upstream of the inlet to prevent or minimise the ingress of oxygen through the inlet and into the reactor. The rubber containing waste may be pre-heated in the air lock chamber.

In an embodiment of the first and/or second aspects, the process further includes discharging the char product from the outlet and into an outlet air lock chamber to prevent or minimise the ingress of oxygen through the outlet and into the reactor.

In an embodiment of the first and/or second aspects, the step of transporting the rubber waste along the horizontal axis of the reactor includes transporting the waste along an axial reactor length that is less than about 40 ft.

In an embodiment of the first and/or second aspects, the process includes operating the screw auger in both the forward and reverse directions to agitate the rubber containing waste within the reactor.

In an embodiment of the first and/or second aspects, the rubber containing waste is shredded tyre waste that includes at least rubber, steel, and nylon, and the process includes transporting the shredded tyre waste along the horizontal axis of the hermetically sealed cylindrical reactor. In such cases, it is preferred that after discharging the char product from the reactor, the process includes separating the char product into a metal containing fraction and a carbon char fraction.

In an embodiment of the first and/or second aspects: condensing a condensable fraction of the volatile gas or gases into a liquid condensate.

In an embodiment of the first and/or second aspects, the non-oxidative thermal degradation of the rubber is carried out in the absence of an amount of a catalyst that substantially affects the rate of degradation of the rubber. It is preferred that the non-oxidative thermal degradation of the rubber is carried out in the absence of a catalyst.

In another aspect of the invention, there is provided a method including: using the hermetically sealed flow-through reactor or system described herein for the thermal degradation of a rubber containing waste.

In still another aspect of the invention, there is provided the use of the hermetically sealed flow-through reactor or system described herein for the thermal degradation of a rubber containing waste.

In still a further aspect of the invention, there is provided the hermetically sealed flow-through reactor or system as described herein when used to thermally degrade a rubber containing waste.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
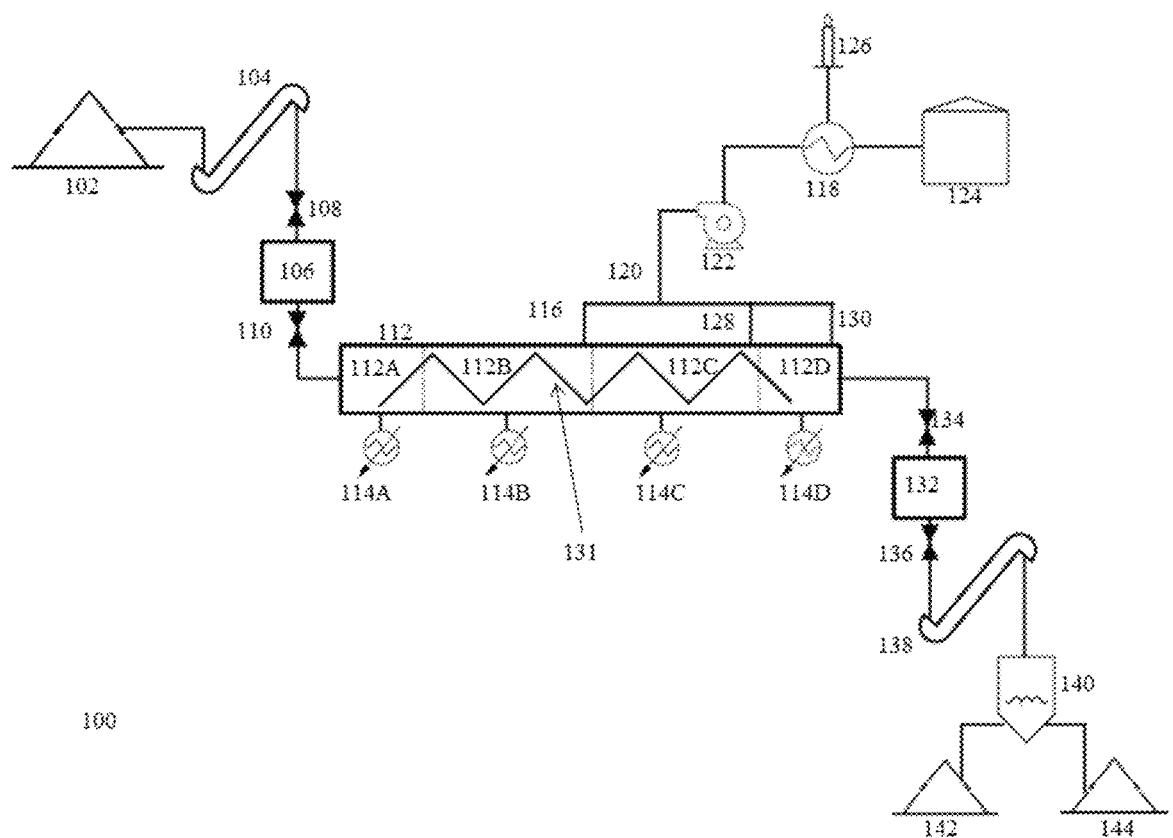
FIG. 1 is a process flow diagram showing the primary unit process for the thermal degradation of rubber containing waste.

A schematic of the system 100 for thermal degradation (also known as depolymerisation) of rubber containing waste is shown in FIG. 1. This schematic is illustrative of an embodiment of the system 100, and should not be construed in a limiting manner. The skilled addressee will appreciate that the system 100 may include other unit processes, as well as sensors and controllers (which are not illustrated).

The system 100 can be used to process a wide variety of different rubber containing wastes, but is particularly adapted for a feedstock of tyre waste 102. The tyre waste 102 will generally be in the form of shredded or stripped tyre waste. Shredded tyres are tyres that have been run through a shredder without any separation of the different tyre components (such as rubber and steel mesh). As such, shredded waste consists of size reduced pieces of tyre that retain at least rubber, steel mesh, and other reinforcement fibres in an integrated form. This is in comparison to stripped rubber tyre waste that consists primarily of tread rubber that has been stripped from the body of the tyre. Stripped rubber tyre waste does not include steel mesh. The system is preferably used to treat shredded tyre waste, such as 100 mm or 50 mm classified shredded tyre waste.

The system 100 and process makes use of a hermetically sealed cylindrical flow through reactor 112. The reactor has a cylindrical reactor body, such as in the form of a sheet metal or plate metal shell, and the cylindrical reactor body has an internal cylindrical surface and an external cylindrical surface. The advantages of the external and internal cylindrical surfaces are discussed in relation to certain embodiments below.

The tyre waste 102 is fed via a conveyor 104 into an airlock chamber 106 between inlet valve 108 and outlet valve 110. During loading of the airlock chamber 106, inlet valve 108 is in the open position to permit passage of the tyre waste there through while outlet valve 110 is in the closed position. Once the air lock chamber 106 has been loaded with tyre waste, inlet valve 108 is moved to the closed position providing a hermetic seal to airlock chamber 108. Outlet valve 110 can then be opened to permit passage of the tyre waste from the airlock chamber 108 into a hermetically sealed flow-through reactor 112. The reactor 112 is oriented horizontally, such that the reactor 112 has a horizontal axis along which the tyre waste is transported through the reactor 112. The arrangement of airlock chamber 106 with valves 108 and 110 is to limit or minimise the introduction of air (in particular oxygen) into the reactor 112. It will be appreciated that a range of different airlock arrangements may be used. For example, a wide variety of different valves may be used as valves 108 and 112. By way of example, rotary valves are commonly used in airlock arrangements, and may be employed in this situation. However, the inventors have found that the use of knife-gate valves is preferable. In addition to providing an effective gas seal, knife-gate valves are of simpler design, less prone to blockage, more tolerant of different feed sizes and types, and are generally of smaller size than rotary valves which allows the system to be more compact. It will be appreciated that some air (including oxygen) will be entrained with the tyre waste as it is introduced and sealed in airlock chamber 106.

Figure 2:
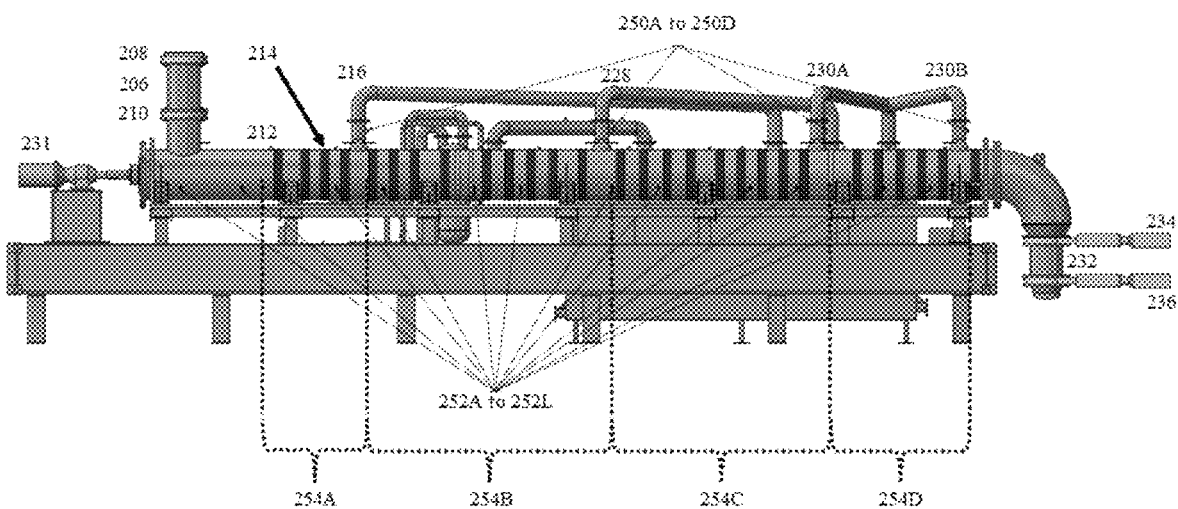
FIG. 2 is an elevation schematic of an embodiment of the reactor for the thermal degradation of the rubber containing waste.

An embodiment of the reactor 112 is illustrated in FIG. 2 In the embodiment of FIG. 1, the reactor 112 is divided into four different thermal zones: a heating zone 112A, a first thermal reaction zone 112B, a second thermal reaction zone 112C, and a cooling zone 112D. Each of these thermal zones is provided with a heater 114A, 114B, 114C, and 114D respectively. The size and number of thermal zones provided in a given reactor is dependent on the chemical make-up and nature of the waste feedstock. However, generally it is desirable to have at least a heating zone, a cooling zone, and at least one thermal reaction zone there between. The present embodiment includes two thermal reaction zones, the reasons for which will be discussed in more detail later. It should also be noted that the size of each of the thermal zones may be the same or different. The size of each thermal zone depends on the desired residence time in that zone. By way of example, heating and cooling processes may require less residence time to achieve completion than rubber depolymerisation in the thermal reaction zones 112B and 112C. In such instances, the thermal reaction zones 112B and 112C will be dimensionally longer than the heating and cooling zones 112A and 112D respectively. Further, the thermal reactions occurring in thermal reaction zones 112B and 112C may require different residence times, in which case thermal reaction zones 112B and 112C are of different lengths. It will be appreciated that in some embodiments, the heating zone 112A and the cooling zone 112D may be separate thermal reaction zones or may form a part of the same thermal reaction zone.

Each of the zones 112A, 112B, 112C, and 112D is illustrated as having only a single heater. However, it will be appreciated that each of these zones may have plural heaters. Plural heaters may be used to ensure that a more consistent temperature is maintained across the full length of a zone, or to apply a temperature gradient across a zone. The number of heaters per thermal zone may differ depending on the size and/or heat requirements of that zone. The skilled addressee will appreciate that a range of different heaters may be used for example: electric heaters, induction heaters, or a combination thereof (although it should be noted that induction heaters are only suitable when the tyre waste includes a ferromagnetic material such as steel or iron—e.g. shredded tyre waste). The inventors have found that electric band heaters are particularly useful with the cylindrical reactor design as they allow for the reactor to process a wide variety of different rubber wastes. Band heaters can also be used to as well as providing a reasonably consistent and controllable temperature profile in along the axial direction of a thermal zone, and a controllable temperature gradient in the radial direction. Each of the heaters in a given zone may be controlled independently of any other heater in that zone. For example, where a thermal reaction zone includes a plurality of band heaters, each of those heaters may be independently controllable to ensure a desired temperature or temperature gradient is maintained across that zone. Such control may be desirable where two adjacent zones are operated at significantly different temperatures.

The tyre waste is received from the airlock 106 into the heating zone 112A of the reactor 112. It will be appreciated that some air (and hence some oxygen) is entrained with the tyre waste when it is fed into the airlock 106, and as such, this air will be fed into the reactor 112 along with the tyre waste. However, the amount of air entrained with the tyre waste is small, and the airlock 106 effectively prevents extraneous air from flowing into the reactor.

In this the heating zone 112A, the tyre waste is pre-heated to a temperature that is below the thermal degradation temperature of rubber in order to soften the rubber in the tyre waste. The purpose of the heating zone 112A is to provide sufficient heat energy to overcome the energy absorbance of the rubber itself while maintaining a safe temperature which avoids potential explosion as a result of the exposure of any volatile gases formed in the heating zone 112A to oxygen gas entrained in the tyre waste feed. The tyre waste is typically heated to a temperature in the range of 200° C. to 400 350° C., preferably 250° C. to 350 330° C., more preferably 280° C. to 320° C., and most preferably about 300° C. The thermal degradation of rubber commences from approximately 320° C., as such, it is generally preferred that the temperature does not substantially exceed this value. However, it may be beneficial in some instances to heat the tyre waste to a temperature slightly above that required for degradation so that rubber degradation has commenced as the tyre waste is fed into the first thermal reaction zone. Once the tyre waste has reached the desired temperature, the tyre waste is fed into the thermal reaction zones for processing. In the present embodiment, the tyre waste is first processed in thermal reaction zone 112B prior to further processing in thermal reaction zone 112C. In some embodiments, the heating zone is a sub-portion of the first thermal zone.

In the first thermal reaction zone 112B, the tyre waste is heated and processed at a temperature sufficient to break sulfur bonds in vulcanised rubber, and to volatilise sulfur and/or sulfur compounds in the rubber. Preferably, the temperature of the first thermal reaction zone (and thus the temperature to which the tyre waste is heated) is above the boiling point of sulfur (444.6° C.) but below the temperature at which complete depolymerisation of rubber molecules occurs. In view of this, it is preferred that the first thermal reaction zone 112B is operated at a temperature of from at least 445° C. and up to 550° C. More preferably, the first thermal reaction zone 112B is operated at a temperature of from 450° C. and up to 530° C., and most preferably from 460° C. and up to 500° C. By "operated at a temperature" it is meant that the tyre waste in that zone is heated to a temperature within the specified range. Reaction gases including the volatilised sulfur and/or sulfur compounds are extracted from the system via gas extraction pipe 116 and sent to a condenser 118 via exhaust manifold 120 and gas extraction blower 122 where any condensable fraction is separated and stored in storage tank 124 and any non-condensable fractions are flared in burner 126. To this end, the gas extraction blower is operated to apply a suction pressure (or negative pressure) to the reactor 112. Primarily, the gas generated in the first reaction zone is a non-condensible gas that includes gaseous sulfur and/or sulfur compounds, which when flared form sulfur oxides (SOx). However, some depolymerisation of rubber into volatile organic compounds (VOC) may occur, and these VOCs can be separated as a condensable fraction. As a result of treatment in the first thermal reaction zone 112B a reduced sulfur tyre waste is formed. This reduced sulfur tyre waste is then passed into the second thermal reaction zone 112C.

In the second thermal reaction zone 112C, the reduced sulfur tyre waste is heated above the temperature required for the complete thermal degradation of rubber. This results in depolymerisation of rubber in the tyre waste into VOCs and carbonaceous ash (primarily carbon but generally also contains other non-organic ash components). The type of VOCs that are formed is dependent, in part, on the temperature of this zone. At higher temperatures depolymerisation products from the degradation of rubber may themselves further degrade into smaller VOCs. By way of example, the formation of smaller VOCs suitable for use as a fuel (such as diesel) generally require high temperatures of 1400° C. or greater. In view of this, the temperature of this zone 112C may be selected to target the production of particular VOCs. Generally, the second reaction zone is operated at a temperature of at least 550° C. However, higher temperatures may be advantageous as they provide a more rapid rate of thermal degradation, but this needs to be balanced against increased cost from higher energy usage and the desired output VOCs. The upper temperature limit in this zone 112C will ideally be below 1370° C. (such as 1350° C. or 1300° C.). As above this temperature, any steel in the tyre waste will melt. Molten steel may damage the reactor and create downstream problems, such as with the separation of the char residue into a metal containing portion and a non-metal containing portion. Notwithstanding the above, it is generally desirable that the upper temperature limit of this zone is 700° C. At temperatures above 700° C. the fibres (originally present in the sidewall portion of the tyres) begin to break down. The degradation of these fibres may produce chlorine which can react with rubber depolymerisation products to form chlorinated furans (such as polychlorinated dibenzofurans). Chlorinated furans are hazardous to the environment and human health, and as such the production of these compounds is undesirable. Even more preferably the upper temperature limit of this zone is 650° C., and most preferably 600° C. A preferred operating temperature is in the range of 550° C. to 600° C. which favours the production of dl-limonene. The limonene may be in the form of d-limonene, l-limonene, or dl-limonene.

The VOCs formed in the second thermal reaction zone 112C are removed via extraction pipe 128, exhaust manifold 120 and gas extraction blower 122, before being processed in condenser 128 where the condensable organic compounds are separated from any non-condensable components and stored in storage tank 124. The non-condensable components are flared in burner 126. By the end of this stage, the solid residue that remains is in the form of char residue (e.g. primarily a fine particulate carbonaceous ash and steel mesh). This char residue is then passed to the cooling zone 112D.

The cooling zone is typically operated at a temperature sufficient to prevent condensation of any VOCs that have not been extracted into a liquid (such as fuel oil) and thus produces a dry char residue product. Typically the cooling zone will be operated at a temperature of from about 400° C. to about 500° C. In this case, the cooling zone is also provided with gas extraction pipe 130 (which connects to manifold 120) to further remove volatile organics as a result of the degradation process. After the cooling zone, the tyre residue is discharged through an outlet.

The tyre waste is transported from the inlet, through the heating zone 112A, the first thermal reaction zone 112B, the second thermal reaction zone 112C, and then the cooling zone 112D by an auger 131. The auger 131 includes flights which tracks the internal cylindrical surface of the reactor in close relationship. This arrangement has a number of advantages over systems that employ a typical screw conveyer system in which the auger is located within a standard commercially available U-shaped channel. By way of example, such a system is described in Australian patent publication 2013100048 A4 ("AU 2013100048").

AU 2013100048 describes a reactor that includes a U-shaped reactor based on a modified standard U-shaped screw conveyer system. In this case, the U-shaped screw conveyer has been modified to include a removable top section which acts to close the open ends of the "U" while providing easy access to the main reactor chamber if required. Thus the reactor of AU 2013100048 does not have an internal cylindrical surface, and the auger of AU 2013100048 is unable to track the internal surface in close relationship.

The arrangement of the present invention provides a number of advantages over the U-shaped reactor design of AU 2013100048. In particular, the U-shaped reactor design of AU 2013100048, by virtue of its shape, provides substantial clearance between the rotational conveyancing mechanism and the upper internal surface of the removable top section. The inventors discovered that this allowed rubber clumps to bounce through the rotational conveyancing mechanism from the inlet to the outlet without receiving adequate pyrolytic treatment. In effect, these "bouncers" short-circuited the system resulting in an ash product that undesirably included an amount of un-treated or partially treated rubber. Another issue with the U-shaped reactor design of AU 2013100048 that the inventors have discovered is that the aforementioned clearance permits gases evolved from the pyrolytic degradation of rubber to transfer between different thermal zones of the reactor. This is undesirable as the presence of gases evolved in one thermal zone can have an adverse effect on the thermal degradation of rubber and associated production of gases in another thermal zone. Furthermore, any oxygen that is introduced into this U-shaped reactor is also able to short circuit the system. This is highly dangerous as this permits the oxygen to mix with the volatile gases in a high temperature environment—which can lead to an explosion.

As a further point of difference, AU 2013100048 discloses a method and/or system that includes a magnetic separation process and a cloth separation process upstream of the U-shaped reactor. Thus, any steel or cloth (such as nylon) is removed prior to the thermal degradation process. This allows the process of AU 2013100048 to be operated at high temperatures, such as in excess of 1400° C. There are two key motivations to operate at these high temperatures, the first is to increase the rate of rubber degradation, and the second is to target the production of VOCs that can be used as a fuel for a generator to offset the process energy requirements. In contrast, the present invention uses a lower degradation temperature than is typical with rubber degradation processes. This is due to the presence of steel and nylon or fibres in the tyre waste and the desire to avoid depolymerisation of the fibres, but also to favour the production of limonene. Depolymerisation of tyre rubber into limonene generally occurs at temperatures below 700° C. Limonene will be broken down into smaller molecules at the standard temperatures used for rubber pyrolysis.

In view of the above, AU 2013100048 provides no motivation or teaching to operate the U-shaped reactor at a temperature that is significantly lower than standard rubber degradation processes. AU 2013100048 discloses operating temperatures in excess of 1400° C. which is consistent with the upstream metal and cloth removal processes, and the desire in AU 2013100048 to form volatile gases that can be combusted in a generator to provide electricity.

To address the above discussed shortcomings, the inventors developed a new cylindrical reactor in combination with an auger having flights sized such that there is a tight tolerance between the flights and the internal in cylindrical walls of the reactor. This tight tolerance mitigates or prevents both the occurrence of "bouncers" as well as transfer of gases in the clearance space between edges of the flighting and the internal walls of the reactor. As a result of this arrangement, substantially all of the volatile gases evolved in a thermal reaction zone are transported along with the degrading rubber waste in a channel formed between successive flights of the auger. This arrangement, also helps to prevent any entrained oxygen gas from short circuiting through the system, and thus substantially reduces the risk of explosion.

After passing through the reactor 112, the char product is fed into an air lock chamber 132 between inlet valve 134 and outlet valve 136. This airlock chamber 132 operates in much the same manner as airlock chamber 106 to prevent or minimise the ingress of air into reactor 112. Briefly, inlet valve 134 and outlet valve 136 are generally in the closed position. As the char product is discharged from the reactor 112, inlet valve 134 is opened so that the char product can be received into the airlock chamber 132. Once airlock chamber 132 is loaded, inlet valve 134 is closed. Outlet valve 136 then opens so that the char product can be transferred to conveyor 138, after which outlet valve 136 is then closed. A wide variety of different valves may be used as valves 134 and 136. By way of example, rotary valves and gate valves may be employed. It is preferred that orifice plate knife gate valves are used. The inventors found that the particulate ash in the char residue tended to infiltrate and form a gunk in the moving components of standard gate and rotary valves. The use of an orifice plate knife gate valves mitigates this.

Conveyor 138 transports the char product to a separator 140. During transport on conveyor 138, the char product continues to cool. The separator 140 separates the char product into a metal containing fraction 142 that includes the steel mesh, and a non-metal containing fraction 144 that is the particulate carbonaceous ash. A variety of different separation processes may be used, for example a simple screen may be employed which permits the passage of the particulate carbonaceous ash therethrough, while diverting the steel mesh into a separate stream. Alternatively, a magnetic separator may be employed.

The system 100 is controlled by a control system (not illustrated). The control system is used to control the temperature, negative pressure, and residence time within each of the thermal zones 112A, 112B, 112C, and 112D of the reactor 112. The control system may include sensors for reporting parameters back to the control system. These sensors may be located to determine the temperature and/or pressure in each of the thermal zones 112A, 112B, 112C, and 112D of the reactor 112; and/or rotational speed of the auger 131.

Temperature can be controlled in each zone by controlling each of the heaters 114A, 114B, 114C, and 114D.

Negative pressure can be controlled in the reactor 112 through control of the gas extraction blower 122, through throttling valves (not shown) upstream of the gas extraction blower 122 such as on lines 116, 128, 130, or in manifold 120; or valves (also not shown) that are downstream of the gas extraction blower 122. As discussed previously, the size and arrangement of the auger 131 within the reactor 112 minimises gas communication between thermal zones 112A, 112B, 112C, and 112D, as such, in some embodiments the control system is also able to apply a different negative pressure across a particular zone and/or apply or vary pressure drop across each of lines 116, 128, or 130, such as by including a flow restrictor or a throttlable valve on one or more of lines 116, 128, or 130 (if present). Alternatively, application of different negative pressures to each of the thermal reaction zones may be affected by having a different pressure drop across lines 116, 128, or 130, which may be achieved by having lines of different size and/or shape, or the manner in which lines 116, 128, and 130 are connected to manifold 120. Applying different negative pressures to different zones is particularly beneficial where different gaseous reaction products (or different amounts of those products) are produced in the different zones, such as with the present system where sulfur based gases are evolved in thermal reaction zone 112B and hydrocarbon based gases are evolved in thermal reaction zone 112C. Maintaining differently pressured environments can also be used to favour production of certain organic compounds over others. For example, a first thermal reaction zone may be operated at a first pressure, and a second thermal reaction zone may be operated at a second pressure, wherein the first pressure and the second pressure are different. In each case, the pressure is a function of the temperature, the quantity of volatile gases, and the application of negative pressure applied via the gas extraction pipe for that thermal reaction zone.

Residence time in the reactor 112 can be controlled by altering the speed and/or direction of rotation of the auger 131. Slower rotational speeds result in a longer residence time, whereas fast rotational speeds result in short residence times. The inventors have also found that the length of the reactor 112 can be reduced by adopting an operating strategy whereby the auger 131 moves in both the forward and the backward direction. This forward-backward movement is also beneficial for agitating the tyre waste as it moves through the system. By way of example, one such operating strategy is for the auger 131 to rotate forward (F) a set distance (or for a set time), then rotate backward (B) for the same distance and time, and then forward again before repeating i.e. F-B-F, F-B-F etc. The skilled addressee will appreciate that different operating patterns may be used and is not limited to a 3 step F-B-F pattern. The skilled addressee will also appreciate that each of the F and B steps may be the same or different in terms of duration, speed, or number of auger rotations, provided that the tyre waste is ultimately progressed from the inlet to the outlet of the reactor 112.

In addition to providing control of the process, the controller may additionally be programmed so that it can determine appropriate operating conditions for different feedstock. The operating conditions may change based on the size of the feed (for example, 50 mm shred tyre waste will typically require less processing time than 100 mm shred tyre waste), the desired output products (for example, depolymerisation of rubber into smaller organic molecules generally requires a higher operating temperature), or the nature of the material to be treated (such as the type of rubber, the presence of other constituents with the rubber such as fibre or steel mesh) etc.

In various embodiments, the control system is also configured to control the other unit processes to ensure that operation of the overall process is streamlined. Thus, the control system may be configured to control: conveyors 104 and 132; the loading and unloading of airlock chambers 106 and 12 via valves 108, 110, 134, and 136 respectively; separator 140; condenser 118; and operation of burner 126.

Figure 3:
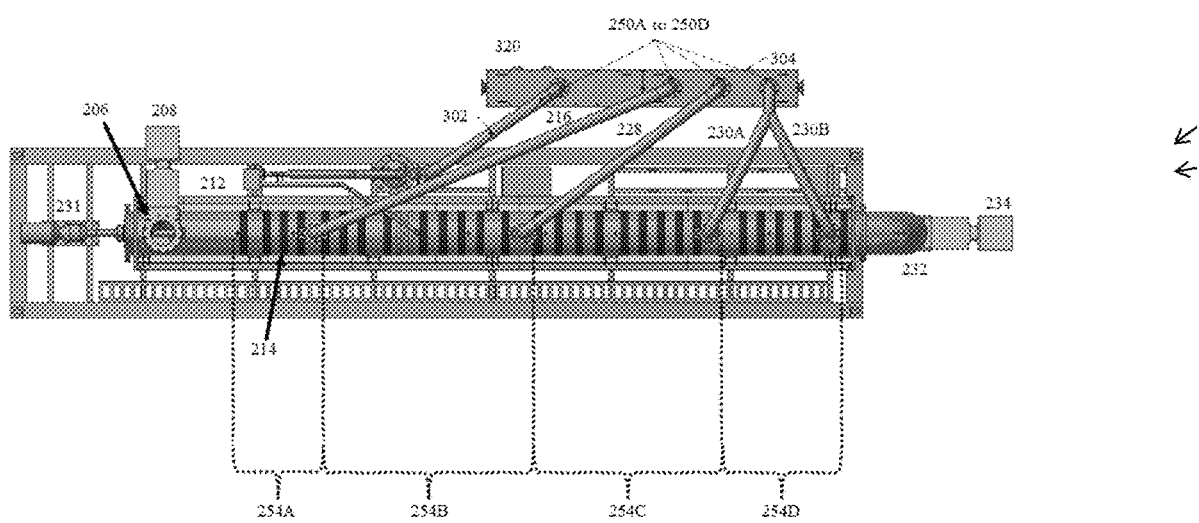
FIG. 3 is a plan schematic of the embodiment of the reactor of FIG. 2.

Another embodiment of a cylindrical reactor 212 of the invention is illustrated in FIGS. 2 and 3. In this embodiment, the cylindrical reactor 212 is formed from steel plate and has an internal cylindrical surface and an external cylindrical surface.

The reactor 212 includes: an inlet air lock chamber 206 located between knife gate valves 208 and 210, an outlet air lock chamber 232 located between orifice plate knife gate valves 234 and 236, and a cylindrical body (generally shown as 212) located there between. In use, rubber containing waste is fed into the reactor from inlet airlock chamber 206 and through valve 210. The rubber containing waste is then transported along the horizontal axis of the cylindrical reaction 212 where it is converted into the char product which is then discharged via valve 234 into outlet airlock chamber 232. Once the outlet airlock chamber 232 is full, valve 234 closes and valve 236 is subsequently opened to release the char product from the outlet airlock chamber 232.

The rubber containing material is transported along the horizontal axis of the reactor 212 via a screw auger 231 that is located within the reactor 212. Each of FIGS. 2 and 3 show the motor component of the screw auger 231 projecting from the inlet end of the reactor 212. This motor can be controlled to rotate the screw auger 231 in both the forward and reverse directions as generally described in relation to the embodiment of FIG. 1.

In this embodiment, the reactor 212 includes twenty eight band heaters (generally labelled as 214) which are located at various intervals along the horizontal axis and on the external surface of the reactor 212. This arrangement of band heaters 214, in combination with the cylindrical geometry of the reactor 212 provides for even heat transfer into the reactor 212 in at least the radial direction. The axial spacing of the band heaters may be selected so as to effectively maintain a substantially constant temperature profile across a given reaction zone.

In this particular embodiment, the reactor includes four reaction zones spaced along the horizontal axis labelled 254A, 254B, 254C, and 254D. Each of the thermal reaction zones 254A to 254D includes a plurality of band heaters and a gas outlet (see 216, 228, 230A and 230B). In order to effectively control the temperature in each thermal reaction zone 254A, 254B, 254C, and 254D, a plurality of temperature sensors 252A to 252L are spaced along the horizontal axis of the reactor 212. Each thermal reaction zone 254A, 254B, 254C, and 254D also includes a corresponding gas outlet 216, 228, 230A and 230B. A negative pressure is applied via each gas outlet 216, 228, 230A and 230B to withdraw volatile gases that are formed in the corresponding zone. Pressure sensors 250A to 250D are located in each of the gas outlets to ensure an appropriate negative pressure is applied.

As discussed above, the reactor 212 includes four separate thermal reaction zones. The first thermal zone 254A includes the first four band heaters and ends downstream and adjacent gas outlet 216; the second thermal zone 254B includes the next 9 band heaters and ends downstream and adjacent gas outlet 228; the third thermal zone includes the next 9 band heaters and ends downstream and adjacent gas outlet 230A; the fourth thermal zone includes the next 5 band heaters and ends downstream and adjacent gas outlet 230B. Thus, the number of band heaters associated with the thermal zones is twenty seven. The last band heater is located downstream of gas outlet 230B, and this band heater is operable to maintain the temperature of the char product above a temperature of 400° C. This is to prevent any VOCs that remain within the system (such as those entrained within the char product) from condensing into an oily residue that may adhere to, or otherwise form a gunk in the reaction vessel, in moving parts associated with the reaction vessel (for example valves 234 or 236, or in any downstream equipment.

During operation, thermal energy is applied to each thermal zone via the corresponding band heaters to heat the rubber containing waste above the degradation temperature of rubber which causes the generation of volatile gases and converts the rubber to the char product. Due to the tight tolerance between the edges of the screw auger 231 flighting and the internal cylindrical surface of the reactor 212 a substantial portion of the volatile gases evolved in a given thermal reaction zone are transported along with the rubber containing waste in a channel formed between successive flights of the auger 231. These gases are transported through that thermal zone until they reach the portion of that thermal zone that includes the gas extraction pipe at which point a substantial portion of those volatile gases is then withdrawn.

Each of the gas extraction pipes 216, 228, 230A and 230B feed into an exhaust manifold 320. In this particular case, the third and fourth gas outlets 230A and 230B are merged into a single pipe 231 that is the same diameter as gas outlets 216 and 228 via Y-junction 230, and this single pipe 231 feeds collective exhaust gas taken directly from gas outlets 230A and 230B to the exhaust manifold 320. Due to this arrangement, the gas extraction system is a "tuned" system that balances the volumetric flow rates of gases through the various stages of the process. Gas extraction pipes 216, 228, 230A, and 230B are all of the same diameter and similar lengths. Given this, gas extraction pipes 216 and 228 exhibit a pressure drop that is about the same, and as such, the volumetric flow rate of gases taken off from gas extraction pipes 216 and 228 is about the same. Whilst gas extraction pipes 230A and 230B also have the same diameter as gas extraction pipes 216 and 228, pipes 230A and 230B are connected via a Y-junction upstream of the extraction manifold 320 and single pipe 231 (also of the same diameter as pipes 216, 228, 230A, and 230B) feeds from the Y-junction into exhaust manifold 320. Thus, the combined volumetric gas flow rate from pipes 230A and 230B is about the same volumetric gas flow rate as for each of pipes 216 and 228. In other words, the volumetric gas flow rate from each of pipes 230A and 230B is about half the volumetric gas flow rate through pipes 216 and 228. This "tuned" arrangement is beneficial as the largest volumes of gas are generated in the first thermal reaction zone 254A and the second thermal reaction zone 254B, whereas much lower volumes of gas are typically generated in thermal reaction zones 254C and 254D. Another advantage of the "tuned" gas extraction system is that the reduction in gas extraction flow rate at downstream thermal zones of the reactor reduces the carry over of dried carbon/char into the waste system.

The exhaust manifold 320 includes a temperature sensor 304 to monitor the temperature of the withdrawn volatile gases. The manifold also includes an outlet pipe 302 for feeding the volatile gases to a condenser. In some embodiments, the outlet pipe 302 also includes a temperature sensor.

Figure 4:
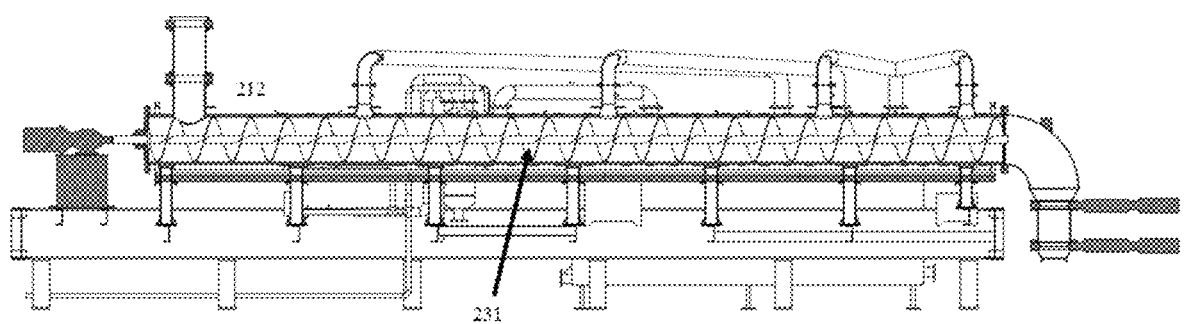
FIG. 4 is a cross section along the axis of the reactor of FIG. 2.
Figure 5:
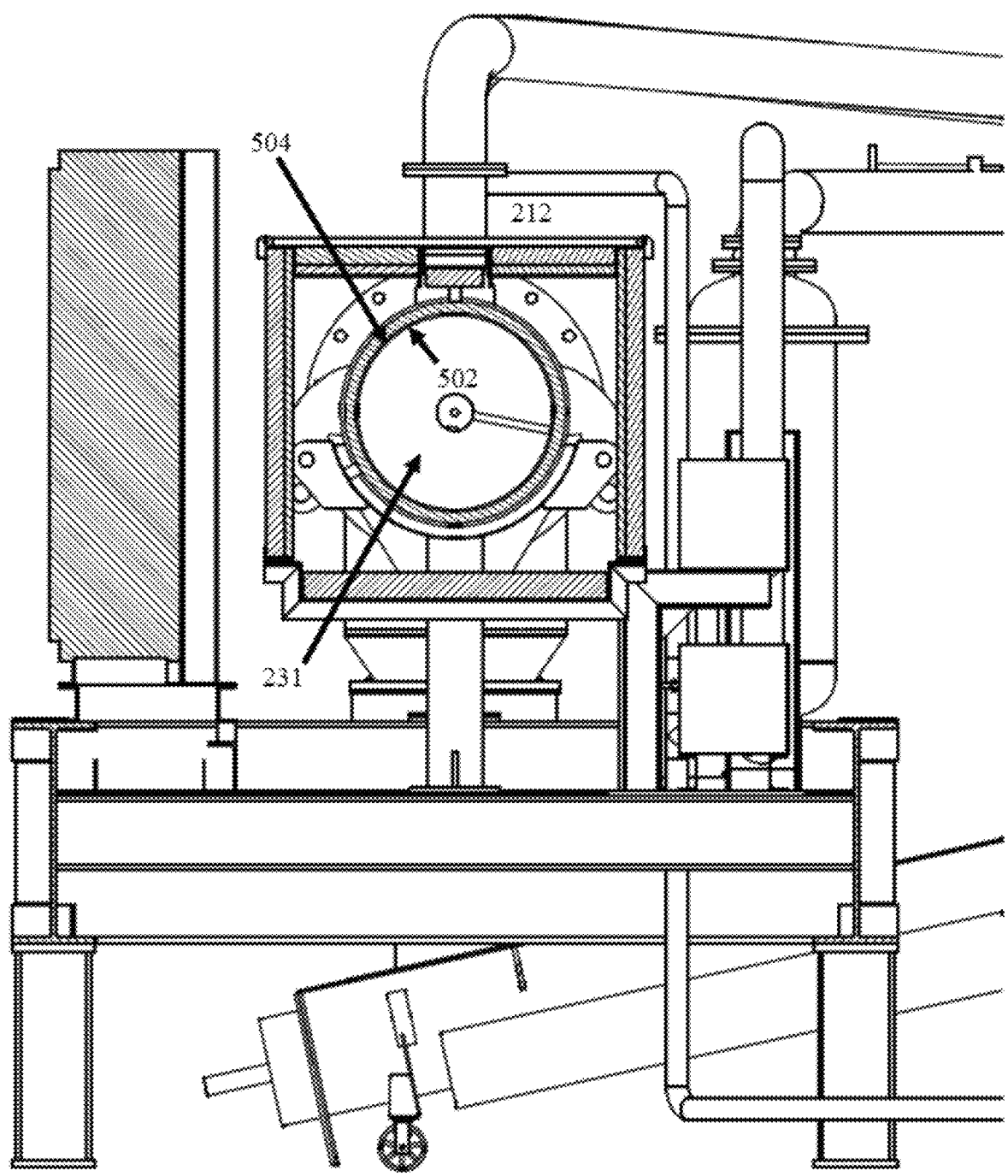
FIG. 5 is a cross section orthogonal to the axis of the reactor of FIG. 2.

FIG. 4 shows a cross section through and along the axis of the reactor 212 illustrated in FIGS. 2 and 3. Notably, the orientation of the screw auger 231 can be seen within the reactor. FIG. 5 shows a cross section orthogonal to the axis of the reactor 212. Again, the position of the screw auger 231 is illustrated. As can be seen there is minimal clearance space between the flight edges 502 and the internal cylindrical wall 504 of the reactor 212.

It will be understood that the invention disclosed and defined in this specification extends to all alternative combinations of two or more of the individual features mentioned or evident from the text or drawings. All of these different combinations constitute various alternative aspects of the invention.

EXAMPLE

Tables 1, 2, and 3 show the operating conditions used to convert a 50 mm classified shredded tyre waste feed stock to a char product. These Tables report data from a daily run sheet. In this case, 50 mm classified shredded tyre waste including steel was fed into the reactor. The feed commenced at 06:30 and finished at 15:30. The residence time in the reactor was 1 hour, with the initial outfeed exiting the reactor at 07:30. Given the 1 hour residence time, the reactor was emptied at 16:30. Table 1 reports a production total of 635 kg carbon, 246 kg steel, and 600 L of oil.

Figure 6:
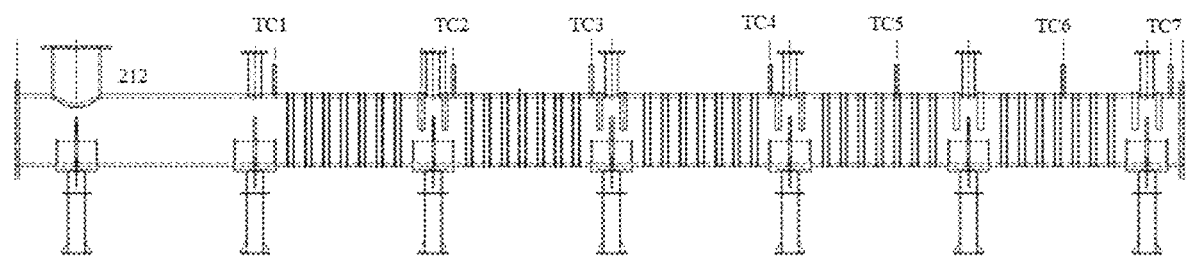
FIG. 6 is a schematic of an embodiment of the reactor showing the location of temperature sensors.

Table 2 shows the temperatures measured at various points along the reactor denoted TC1-TC8 and G1-G7. FIG. 6 shows the positions of temperature sensors TC1-TC7 on the top of the reactor 212 and adjacent to the exhaust manifolds. Note that TC8 is positioned in the final exhaust manifold and is therefore not shown in FIG. 6. G1-G7 are also temperature gauges. These are positioned, as indicated in Table 2, within the bed of the reactor. Table 3 provides operational details across the condenser.

TABLE 1

| PRODUCTION | | | | | | | | | | | |
|---|---|---|---|---|---|---|---|---|---|---|---|
| Feed Stock Used | | | | 50 mm classified shredded tyre waste with STEEL | | | | | | | |
| Carbon Produced | 635 | Kgs | Carbon Weight Tally | 95 | 88 | 100 | 97 | 100 | 95 | 60 | |
| Steel Produced | 246 | Kgs | Steel Weight Tally | 43 | 10 | 68 | 69 | 56 | | | |
| Oil Produced | 600 | Liters | Oil Start Measurement | 950 | Start Conversion | 9000 | | Oil Finish Measurement | 1000 | Finish Conversion | 9600 |

| | | | | Through Time | | | |
|---|---|---|---|---|---|---|---|
| Time Keeping | | | | 1 | Hours | 0 | Mins |
| Infeed | Infeed | Projected | Projected | Rubber Into Infeed | | Outfeed Produced | |
| Start | Stop | Outfeed | Empty | Time | Amount | Time | Temp |
| 6.30 | 15.30 | 7.30 | 16.30 | 10.00 | 500 | 8.40 | 35 |
| | | | | 11.35 | 550 | 10.00 | 30 |
| | | | | 14.40 | 550 | 11.15 | 33 |
| | | | | | | 12.40 | 38 |
| | | | | | | 14.00 | 42 |
| | | | | | | 15.45 | 33 |
| | | | | | | 16.30 | 33 |

TABLE 2

| Time | 300 TC1 | 400 TC2 | 440 TC3 | 455 TC4 | 475 TC5 | 400 TC6 | 220 TC7 | TC8 | @TC2 G1 | BETWEEN G2 | @TC3 G3 | BETWEEN G4 | @TC4 G5 | @TC5 G6 | @TC6 G7 |
|---|---|---|---|---|---|---|---|---|---|---|---|---|---|---|---|
| 6.30 | 260 | 257 | 363 | 451 | 419 | 328 | 88 | 76 | 445 | 460 | 405 | 590 | 500 | 450 | 350 |
| 7.00 | 269 | 265 | 373 | 453 | 432 | 341 | 98 | 76 | 445 | 465 | 410 | 580 | 500 | 470 | 370 |
| 7.30 | 270 | 269 | 376 | 455 | 437 | 362 | 135 | 75 | 430 | 450 | 400 | 550 | 485 | 470 | 405 |
| 8.00 | 270 | 269 | 372 | 455 | 433 | 376 | 162 | 74 | 420 | 430 | 390 | 540 | 475 | 450 | 420 |
| 8.30 | 271 | 270 | 367 | 454 | 423 | 373 | 183 | 74 | 420 | 420 | 385 | 540 | 475 | 435 | 410 |
| 9.00 | 273 | 270 | 363 | 454 | 418 | 363 | 191 | 74 | 420 | 405 | 380 | 540 | 475 | 430 | 400 |
| 9.30 | 277 | 271 | 361 | 455 | 416 | 357 | 195 | 73 | 420 | 400 | 380 | 540 | 475 | 430 | 390 |
| 10.00 | 280 | 271 | 359 | 455 | 420 | 360 | 197 | 73 | 415 | 395 | 375 | 540 | 475 | 445 | 395 |
| 10.30 | 282 | 270 | 355 | 453 | 421 | 361 | 202 | 72 | 415 | 390 | 370 | 530 | 475 | 435 | 400 |
| 11.00 | 284 | 270 | 352 | 452 | 416 | 359 | 203 | 72 | 415 | 390 | 370 | 530 | 475 | 430 | 390 |
| 11.30 | 284 | 268 | 349 | 450 | 417 | 361 | 204 | 72 | 405 | 380 | 355 | 525 | 465 | 440 | 400 |
| 12.00 | 284 | 266 | 345 | 447 | 413 | 360 | 208 | 71 | 400 | 375 | 350 | 520 | 460 | 425 | 390 |
| 12.30 | 283 | 267 | 341 | 444 | 408 | 357 | 208 | 71 | 410 | 375 | 355 | 520 | 460 | 425 | 390 |
| 13.00 | 283 | 268 | 340 | 446 | 413 | 361 | 206 | 71 | 405 | 375 | 350 | 520 | 460 | 430 | 395 |
| 13.30 | 282 | 268 | 339 | 446 | 413 | 360 | 206 | 71 | 400 | 370 | 350 | 520 | 460 | 425 | 395 |
| 14.00 | 281 | 267 | 337 | 444 | 407 | 358 | 206 | 71 | 420 | 375 | 350 | 520 | 455 | 425 | 390 |
| 14.30 | 284 | 273 | 346 | 456 | 419 | 360 | 193 | 72 | 440 | 400 | 375 | 550 | 480 | 450 | 390 |
| 15.00 | 287 | 275 | 352 | 455 | 425 | 361 | 197 | 72 | 430 | 400 | 375 | 540 | 475 | 445 | 400 |
| 15.30 | 289 | 273 | 351 | 454 | 421 | 359 | 201 | 72 | 420 | 395 | 370 | 530 | 475 | 435 | 400 |
| 16.00 | 291 | 276 | 354 | 453 | 418 | 360 | 203 | 72 | 445 | 420 | 380 | 540 | 475 | 435 | 395 |
| 16.30 | 265 | 275 | 346 | 432 | 433 | 364 | 192 | 72 | 415 | 410 | 375 | 510 | 470 | 470 | 400 |

TABLE 3

| MANOMETER | | | TEMPERATURES | | | | | AFTERBURNER | | |
|---|---|---|---|---|---|---|---|---|---|---|
| EXT 1 | COND IN | COND OUT | COND IN | COND OUT | OUTFEED | SPACER | WATER | TEMP | FAN | % |
| −0.01 | −0.03 | −0.03 | 11 | 10 | 13 | 8 | 13 | | | |
| −0.01 | −0.03 | −0.03 | 25 | 10 | 15 | 9 | 16 | | | |
| −0.02 | −0.02 | −0.09 | 67 | 14 | 37 | 14 | 15 | | | |
| −0.01 | −0.01 | −0.10 | 93 | 16 | 57 | 22 | 18 | | | |
| −0.02 | −0.08 | −0.11 | 107 | 19 | 72 | 29 | 21 | | | |
| −0.03 | −0.10 | −0.09 | 108 | 21 | 77 | 34 | 23 | | | |
| −0.04 | −0.06 | −0.06 | 108 | 22 | 78 | 37 | 23 | | | |
| −0.02 | −0.08 | −0.09 | 108 | 23 | 82 | 41 | 22 | | | |
| −0.02 | −0.08 | −0.08 | 113 | 25 | 84 | 45 | 26 | | | |
| 0.00 | −0.09 | −0.09 | 112 | 25 | 87 | 47 | 26 | | | |
| −0.01 | −0.11 | −0.12 | 115 | 27 | 89 | 50 | 28 | | | |
| 0.00 | −0.09 | −0.11 | 123 | 27 | 96 | 53 | 26 | 1076 | 18.5 | 100% |
| −0.03 | −0.05 | −0.06 | 117 | 28 | 91 | 57 | 29 | 1144 | 10 | 100% |

TABLE 3-continued

| MANOMETER | | | TEMPERATURES | | | | | AFTERBURNER | | |
|---|---|---|---|---|---|---|---|---|---|---|
| EXT 1 | COND IN | COND OUT | COND IN | COND OUT | OUTFEED | SPACER | WATER | TEMP | FAN | % |
| 0.00 | −0.12 | −0.12 | 114 | 28 | 86 | 57 | 28 | 1339 | 19 | 100% |
| −0.01 | −0.08 | −0.10 | 121 | 29 | 98 | 56 | 27 | 1371 | 19.5 | 100% |
| −0.01 | −0.05 | −0.07 | 121 | 30 | 92 | 59 | 24 | 1395 | 22.5 | 100% |
| −0.01 | −0.05 | −0.06 | 95 | 29 | 74 | 55 | 30 | 1298 | 9 | 100% |
| −0.06 | −0.12 | −0.14 | 104 | 29 | 75 | 55 | 29 | 1310 | 15 | 25% |
| 0.00 | −0.17 | −0.18 | 113 | 29 | 84 | 53 | 32 | 1238 | 15 | 25% |
| −0.05 | −0.14 | −0.14 | 116 | 30 | 84 | 57 | 29 | 1100 | 15 | 25% |
| −0.03 | −0.02 | −0.02 | 90 | 29 | 73 | 52 | 29 | 723 | 25 | 0% |

The invention claimed is:

1. A process for non-oxidative thermal degradation of a rubber containing waste including a rubber, the process including:
feeding the rubber containing waste through an inlet and into a hermetically sealed cylindrical flow-through reactor having a heating zone, a cooling zone, and one or more thermal reaction zones arranged along a horizontal axis of the reactor between the inlet and an outlet of the reactor, wherein the one or more thermal reaction zones are located between the heating zone and the cooling zone, wherein the heating zone is located upstream of the one or more thermal reaction zones and the cooling zone is located downstream of the one or more thermal reaction zones,
wherein an axial reactor length of the horizontal axis of the reactor is less than about 40 ft, and
wherein each of the one or more thermal reaction zones is provided with:
one or more heating elements controllable to heat the one or more thermal reaction zones to one or more operating temperatures for mediating the non-oxidative thermal degradation of the rubber, and
one or more gas outlets for withdrawing gas or gases evolved during the non-oxidative thermal degradation of the rubber;
pre-heating the rubber containing waste in the heating zone to a temperature below a thermal degradation temperature of the rubber prior to transporting the rubber containing waste through the one or more thermal reaction zones;
operating the one or more thermal reaction zones at a temperature at or above a thermal degradation temperature of the rubber,
operating a screw auger in both forward and reverse directions to agitate the rubber containing waste within the reactor and to transport the rubber containing waste along the horizontal axis of the reactor, and through the reactor at a rate to provide:
a residence time in each of the one or more thermal reaction zones sufficient to heat the rubber containing waste to a temperature above a degradation temperature of rubber, and to degrade rubber in the rubber containing waste into a volatile gas or gases, fuel oil and a char product, and
a residence time in the reactor of less than 2 hours,
wherein flighting on the screw auger tracks an internal cylindrical surface of the reactor in a close relationship to minimise or prevent transport of volatile gas or gasses and/or char product through a clearance space between outer edges of the flighting and the internal cylindrical surface of the reactor;
cooling the char product in the cooling zone to a temperature below a thermal degradation temperature of the rubber and sufficient to prevent condensation of any volatile organic compounds (VOCs) that have not been extracted into a liquid and produce a dry char residue product prior to discharging the char product from the reactor; and
applying a negative pressure to each of the one or more thermal reaction zones and the cooling zone to withdraw volatile gas or gasses that are formed in that thermal reaction zone;
discharging the char product through the outlet of the reactor.

2. The process of claim 1, wherein the volatile gas or gases include limonene.

3. The process of claim 1, wherein:
the one or more thermal reaction zones include a first thermal reaction zone and a second thermal reaction zone; and
the first thermal reaction zone includes one or more first heating elements, the one or more first heating elements controllable to heat the first thermal reaction zone to a first operating temperature at or above a thermal degradation temperature of the rubber, and
the second thermal reaction zone includes one or more second heating elements, the one or more second heating elements controllable to heat the second thermal reaction zone to a second operating temperature at or above a thermal degradation temperature of the rubber and different to the first operating temperature;
the process further including:
operating the first thermal reaction zone at the first operating temperature, the first operating temperature sufficient to form a first volatile gas or gases, wherein the first volatile gas or gases are the volatile gas or gases formed in the first thermal reaction zone, and
operating the second thermal reaction zone at the second operating temperature, the second operating temperature being higher than the first operating temperature, to convert the rubber to a char product and form a second volatile gas or gases, wherein the second volatile gas or gases are the volatile gas or gases formed in the second thermal reaction zone.

4. The process of claim 1, wherein the rubber containing waste in the one or more thermal reaction zones is heated to a temperature above the degradation temperature of the rubber of from 445° C. and up to 550° C.

5. The process of claim 4, wherein the rubber containing waste in the one or more thermal reaction zones is heated to a temperature above the degradation temperature of rubber of from 460° C. and up to 500° C.

6. The process of claim 1, wherein the cooling step comprises cooling the char product to a temperature below the degradation temperature of the rubber of no less than about 400° C. prior to discharging the char product from the reactor.

7. The process of claim 1, wherein the pre-heating step comprises heating the rubber containing waste in the heating zone to a temperature below the degradation temperature of the rubber and of at least about 300° C.

8. The process of claim 3, wherein the first volatile gas or gases is a sulfur gas or sulfur containing gas.

9. The process of claim 3, wherein the second volatile gas or gases is substantially free of sulfur.

10. The process of claim 3, wherein the second volatile gas or gases comprise(s) limonene.

11. The process of claim 1, wherein the process further includes feeding the rubber containing waste through the inlet via an inlet air lock chamber located upstream of the inlet.

12. The process of claim 1, wherein the process further includes discharging the char product from the outlet and into an outlet air lock chamber.

13. The process of claim 1, wherein flighting on the screw auger tracks the internal cylindrical surface of the reactor in close relationship such that the clearance space is 7 mm or less.

14. The process of claim 1, wherein the rubber containing waste is shredded tyre waste including at least rubber, steel and nylon.

15. The process of claim 3, wherein the first volatile gas or gases are withdrawn at a volumetric flow rate from 1.1 to 3 times a volumetric flow rate of the second volatile gas or gases.

16. The process of claim 1, where a residence time of the rubber containing waste in the heating and cooling zones is less than the residence time in the one or more thermal reaction zones.

17. The process of claim 1, wherein the rubber containing waste is converted into about 39% carbon, about 15% steel and about 34% tyre derived oil.

18. The use of a hermetically sealed flow-through reactor to thermally degrade a rubber containing waste including a rubber, the hermetically sealed flow-through reactor having an internal cylindrical surface, and the reactor including:
an inlet and an outlet,
a heating zone, a cooling zone and one or more thermal reaction zones, wherein the one or more thermal reaction zones are arranged along a horizontal axis of the reactor between the heating zone and the cooling zone and between the inlet and the outlet, wherein the heating zone is located upstream of the one or more thermal reaction zones and the cooling zone is located downstream of the one or more thermal reaction zones, wherein an axial reactor length of the horizontal axis of the reactor is less than about 40 ft, and wherein each of the one or more thermal reaction zones is provided with:
one or more heating elements controllable to heat the one or more thermal reaction zones to an operating temperature for mediating the non-oxidative thermal degradation of the rubber,
one or more gas outlets with each of the one or more gas outlets being connected to an extraction pipe for withdrawing gas or gases evolved during the non-oxidative thermal degradation of the rubber; and
a screw auger located within the reactor, the screw auger configured to rotate in both the forward and reverse directions to agitate and transport the rubber containing waste through the one or more thermal reaction zones in both a forward direction and a reverse direction and to the outlet such that a residence time in the reactor is less than 2 hours,
wherein flighting on the screw auger tracks the internal cylindrical surface of the reactor in a close relationship to minimise or prevent the transport of material through a clearance space between outer edges of the flighting and the internal cylindrical surface of the reactor;
wherein the use comprises:
operating the heating zone so as to pre-heat the rubber containing waste to a temperature lower than the thermal degradation temperature of the rubber containing waste prior to transporting the rubber containing waste through the one or more thermal reaction zones; and
operating the one or more thermal reaction zones at a temperature at or above the thermal degradation temperature of the rubber,
operating the screw auger in both the forward direction and the reverse direction to agitate the rubber containing waste within the reactor and to transport the rubber containing waste along the horizontal axis of the reactor, and through the reactor at a rate to provide:
a residence time in the one or more thermal reaction zones sufficient to heat the rubber containing waste to a temperature above the degradation temperature of rubber, and to degrade rubber in the rubber containing waste into a volatile gas or gases, fuel oil and a char product, and
the residence time in the reactor of less than 2 hours, and
operating the cooling zone so as to cool the char product to a temperature below the thermal degradation temperature of the rubber and sufficient to prevent condensation of any volatile organic compounds (VOCs) that have not been extracted into a liquid and produce a dry char residue product, prior to discharging the dry char residue product from the reactor, and wherein the cooling zone comprises one or more gas outlets for withdrawing gas or gases.

* * * * *